July 1, 1930.  B. F. SMALL  1,769,077

TAPER GAUGE STRUCTURE

Filed July 20, 1928

Inventor
Bernard F. Small

Patented July 1, 1930

1,769,077

UNITED STATES PATENT OFFICE

BERNARD F. SMALL, OF CHICAGO, ILLINOIS, ASSIGNOR TO INTERNATIONAL HARVESTER COMPANY, A CORPORATION OF NEW JERSEY

TAPER-GAUGE STRUCTURE

Application filed July 20, 1928. Serial No. 294,081.

The invention is in a gauge structure.

In the manufacture of tapered roller bearings, it is desirable that the inner cone member of the bearings when finished, and prior to its assembly in a completed bearing, have its taper or conical slope gauged to test the same for its accuracy within certain manufacturing tolerances.

More particularly, therefore, this invention relates to a gauge structure for testing the taper of the kind of work specified.

The objects of the invention are to provide an improved taper gauge structure for the purpose specified; to provide such a structure which is adjustable to enable the same to be rearranged to fit different sizes of work; to provide such a structure including means for testing the taper of a tapered roller bearing cone in two spaced apart horizontal planes; and, lastly, generally to provide an improved structure of this kind which is simple to produce and fool-proof in use. Other objects should appear to those skilled in this art as the disclosure of the invention is made.

Briefly stated, these desirable objects are accomplished in the provision of a gauge structure embodying a base member including a work holding member, there being an abutment member on the base member, and an indicator member including operating means, therefore, also on the base member and spaced away from the abutment member in a manner to permit the entry on the work holding member of a tapered cone between the abutment member and the indicator member to cause the cone to contact the operating means of the indicating member. Both the abutment member and the indicating member are made adjustable in a plurality of directions. If it is desired to get an indication of the taper at another point, another abutment and indicator may be located on the base member to operate or gauge the cone in a different plane.

Reference should now be made to the accompanying sheet of drawings illustrating the improvement of the invention and in which drawings.

Figure 1:
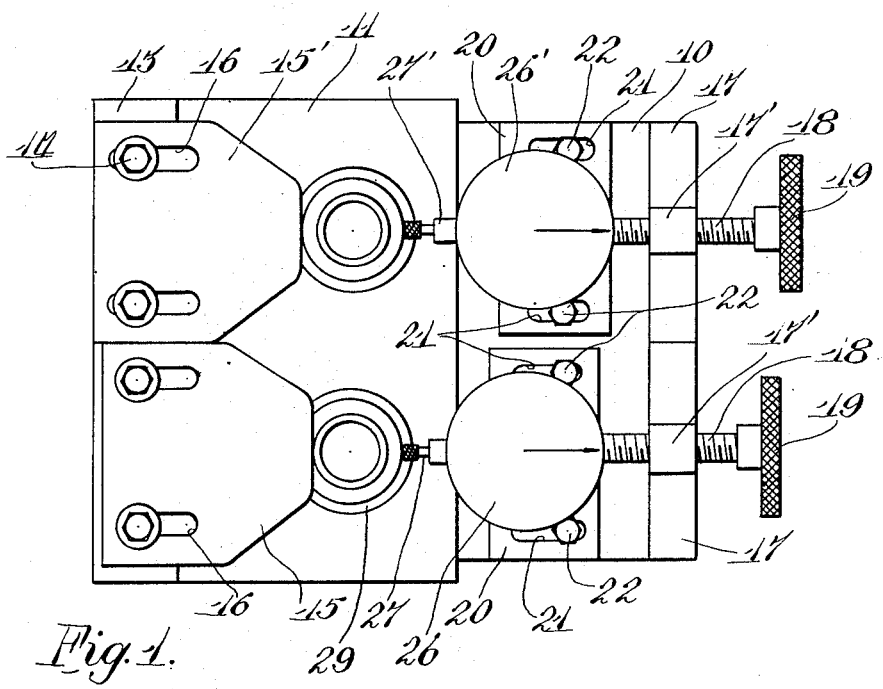
Figure 1 is a top plan view of the gauge structure.
Figure 2:
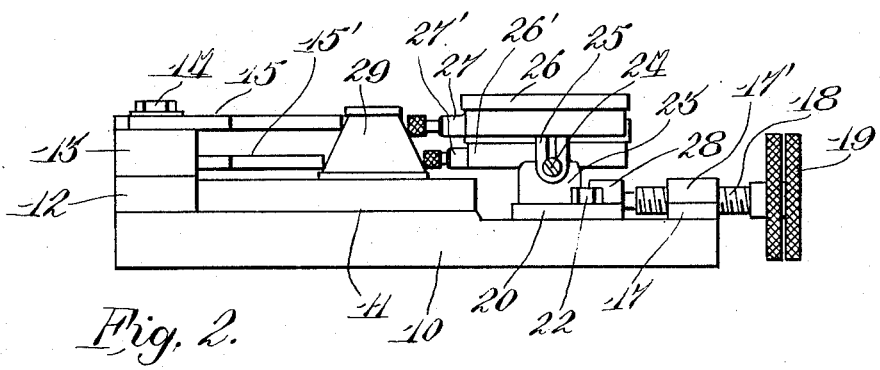
Figure 2 is a side elevational view of the structure shown in Figure 1.

The base member of the gauge structure is indicated at 10, and supported thereon is a smooth flat topped work holder plate 11 the upper surface of which lies in a horizontal plane. At the back end of this plate 11 the base carries a cross bar 12 and on this bar 12 is a spacer block 13 carrying two set screws 14 for mounting a horizontally disposed abutment plate 15 having at opposite sides a pair of slots 16 in which the screws 14 fit for the purpose of enabling the plate 15 to be adjustably mounted for movement as will be understood. The thickness of the spacer block 13 can be varied by providing different blocks and this affords an adjustment for the plate 15 in an up and down direction. It can now be appreciated that the plate 15 is adjustably mounted on the base 10 for movement in a plurality of directions.

At the opposite ends of the base 10 there is provided in alignment with the spacer 12 a plate 17 having an apertured and threaded boss 17' for the reception of a screw bolt 18 which may be operated by the hand knob 19.

As shown in the drawings, the base 10 adjacent the end of the screw 18 carries a plate 20 which is provided with elongated slots 21 which slots receive set screws 22 for securing the plate 20 to the base for slidable adjustment. This plate 20 carries upstanding ears 23 only one of which is shown, which ears are provided with set screws 24 fitted into a slot in a bracket 25 depending from the casing of the indicator 26, the indicator including pressure operating means 27 for moving the usual needle of the indicator. From this description it can be seen that the screw 18 which is in engagement with the boss 28 on the plate 20 causes said plate 20 to be slid to various positions of adjustment when the set screw 22 has been loosened to permit said sliding movement. This also slides the indicator 26 as will be clear. By means of the set screw 24 it is possible to raise or lower the indicator relative to the ears 23. Thus, the indicator is adjustable in a plurality of directions.

Let us assume that it is desired to gauge the taper of a finished cone for a roller bearing. The abutment 15 and the indicator 26 will be properly adjusted in spaced relation the proper amount to receive the cone which is indicated at 29. It will be seen in the drawings that both the indicator and the abutment are adjusted to a relatively high horizontal plane so as to gauge the taper of the cone adjacent the top end of the cone. The operator merely slides the cone between the abutment and the operating member 27 and any inaccuracy in the cone taper will be communicated by the member 27 to the needle of the indicator.

It is desirable also to provide means for gauging the taper of the cone in some horizontal plane lower than the first gauging operation. This is accomplished by providing an abutment 15' mounted in a manner similar to the abutment member 15 but disposing the same in a lower horizontal plane as shown in the drawings. Similarly there is provided a pressure type indicator 26' mounted exactly like the indicator 26 but disposed also in a lower horizontal plane so that the operating member 27' of this indicator will coincide with the adjustment of the plate 15'. It will now be understood that the operator can slide the same cone 29 between the abutment 15' and the operating means 27' and get the gauge test of the taper of the cone near its base.

From this disclosure it must now be clear that a simple and efficient structure has been provided by this invention which achieves all of the desirable objects heretofore recited.

It is the intention to cover all such changes and departures from the embodiment illustrated which do not depart from the spirit of the invention as indicated in the claim.

What is claimed is:

In combination, a horizontally disposed base, a horizontally disposed work holder plate on said base, an abutment member on the base which overhangs the plate, means for securing the abutment member in adjusted positions horizontally relative to the plate, a spacer block carrying said abutment for adjustably setting the abutment vertically relative to the plate, a second plate slidingly carried on the base, means for sliding said second plate to an adjusted position on the base, an indicator carried on said second plate, means for adjustably setting the indicator up or down relative to said second plate, and horizontally disposed operating means included in the indicator, the work to be gauged being carried on the work holder plate between the abutment member and the said indicator operating means.

In testimony whereof I affix my signature.

BERNARD F. SMALL.